United States Patent [19]

Taylor

[11] Patent Number: 5,075,001
[45] Date of Patent: Dec. 24, 1991

[54] METHOD AND APPARATUS FOR RECOVERING FIBROUS MATERIAL FROM A PAPER/PULP PROCESS WATER STREAM

[76] Inventor: James W. Taylor, 37 Chateau De Jardin, Kenner, La. 70065

[21] Appl. No.: 379,079

[22] Filed: Jul. 13, 1989

[51] Int. Cl.$^5$ .......................................... B01D 21/24
[52] U.S. Cl. .................................. 210/248; 210/299; 210/323.1; 210/519; 210/532.1
[58] Field of Search ................ 162/189, 251; 210/483, 210/513, 519, 521, 525, 526, 532.1, 534, 537, 540, 248, 299, 314, 323.1

[56] References Cited

U.S. PATENT DOCUMENTS

| | | | |
|---|---|---|---|
| 881,383 | 3/1908 | Dohan | 210/534 |
| 973,357 | 10/1910 | Lewis et al. | 210/534 |
| 1,061,767 | 5/1913 | Stanley | 162/251 |
| 1,349,112 | 8/1920 | Weiss | 210/483 |
| 1,534,145 | 4/1925 | Stedman | 210/537 |
| 1,709,676 | 4/1929 | Martyn | 210/521 |
| 2,379,411 | 7/1945 | Berges | 210/537 |
| 3,635,346 | 1/1972 | Zuckerman et al. | 210/521 |
| 4,529,482 | 7/1985 | Richter et al. | 162/251 |
| 4,555,340 | 11/1985 | Boyle | 210/248 |

FOREIGN PATENT DOCUMENTS

| | | | |
|---|---|---|---|
| 0145365 | 6/1985 | European Pat. Off. | 162/251 |
| 0134091 | 7/1985 | Japan | 210/525 |
| 1437073 | 11/1988 | U.S.S.R. | 210/519 |

Primary Examiner—Robert A. Dawson
Assistant Examiner—Joseph Drodge
Attorney, Agent, or Firm—Pravel, Gambrell, Hewitt, Kimball & Krieger

[57] ABSTRACT

An apparatus for the recovery of fibrous material from process water used in the manufacture of pulp and/or paper, including recycle fiber facilities. The apparatus involves hydraulic classification in the first stage to separate contaminants having a greater settling velocity than fiber, from fiber and other light contaminants with the same or slower settling velocity of fiber. The second stage of the apparatus involves classification by screening to separate the fine contaminants from the fiber. The degree of classification in each stage is determined by the end use of the fiber recovered.

17 Claims, 3 Drawing Sheets

METHOD AND APPARATUS FOR RECOVERING FIBROUS MATERIAL FROM A PAPER/PULP PROCESS WATER STREAM

BACKGROUND OF THE INVENTION

1. Field of the Invention

The present invention relates to the paper/pulp industry and more particularly relates to an improved method and apparatus for the removal of fibrous material from a paper/pulp process water stream wherein both undesirable waste material and desirable fibrous paper/pulp material can be removed from a flow stream associated with the paper/pulp process water system. Even more particularly, the present invention relates to an improved method and apparatus for recovering fibrous material from a paper/pulp process water stream wherein the process water stream is distributed over a primary treatment vessel and an overflow weir exits the vessel with separation and the weir removing fibrous material therefrom on a continuous basis.

2. General Background

In the process of manufacturing pulp and/or paper, water is used extensively to wash, bleach, screen, clean, transport, or form the final fiber product. Contaminants can enter this water stream in many different ways depending upon the particular process involved. Contaminants can be thus either organic or inorganic in nature and are considered to be contaminants based solely upon their desirability in the final product.

In order to remove contaminants from the process stream, a portion of the water is constantly bled from the system for treatment prior to reuse and/or prior to discharge from the facility. Unfortunately, because of the nature of the process involved, a significant amount of desirable fiber can be carried along with the discharge. In order to comply with the Clean Water Act of 1971, most paper/pulp manufacturing facilities use primary treatment to remove the contaminants from the water stream prior to discharge from the facility. In such primary treatment, typically a settling basin or a clarifier is used to allow the majority of contaminants and the fibrous material to settle together according to Stokes Law. This settled material is then removed and disposed of. At some facilities, this settled material which includes both contaminants and the fibrous material may be returned to the process stream if the final product specification allows. However, the reuse of the fibrous material which is mixed with the contaminants is very rare.

It would thus be desirable to classify and separate the desirable fibrous material from the majority of the other contaminants, allowing for productive use of this recovered fiber and a general reduction in the amount of solid waste material that must be disposed of from the facility.

SUMMARY OF THE PRESENT INVENTION

The present invention provides a relatively low cost method to recover fiber of suitable quality from very dilute water streams containing contaminants from the various processes involved in the manufacture of the pulp and/or paper. The apparatus consists of two stages of classification to recover the fiber along with an acceptable minimal level of contaminants from the water stream. In the first stage, hydraulic classification is used to separate solid material from the waste stream. This separation is based upon the settling velocity of dilute fiber relative to the settling velocity of the contaminants. The water stream is introduced into a vessel at such a rate that the net upward velocity gradient in the vessel would exceed the settling velocity for the majority of the fiber. The contaminants which typically have a faster settling velocity than the net upward velocity gradient of the vessel will settle to the bottom of the vessel and will be discharged from the vessel for further treatment and/or prior to discharge from the facility.

The major portion of the water, fiber and like contaminants will rise in the vessel and will exit the upper portion of the vessel completing the first stage of classification or treatment.

The material exiting the upper portion of the vessel proceeds to the second stage of classification or treatment. The exiting is preferably via a weir overflow structure.

In the preferred embodiment, the second stage of treatment of the apparatus is by means of screening. The majority of like contaminants are small in size relative to the length of the fiber. The water stream exiting the upper portion of the primary vessel is thus passed over a preferably inclined screen media having a suitable mesh opening. The majority of the fiber will be retained on the screen while the majority of the water and like contaminants will pass through the screen for further treatment prior to discharge from the facility. The fibrous material is collected from the screen surface and is either reused at the facility or sold to another facility for use as desired.

Thus, the present invention provides an improved method and apparatus for the recovery of fibrous material from a pulp/paper manufacturing process water stream. The apparatus includes an influent for receiving the process water stream and a primary treatment vessel having an outer sidewall terminating at an upper edge and a bottom wall defining in combination a fluid containment interior.

A fluid distribution apparatus in fluid communication with the influent distributes influent water to multiple space locations about the interior to define a rise rate for flow within the vessel.

An overflow weir defines the vessel fluid surface and allows fluid to exit the vessel at the fluid surface area.

An affluent removes heavy contaminants from the vessel at the lower end portion thereof and a fibrous recovery screen separates fibrous material from the overflowing fluid stream at the weir.

In the preferred embodiment, the distribution apparatus comprises a manifold having multiple discharge outlets spaced about the interior of the primary vessel.

In the preferred embodiment, the weir is positioned adjacent the upper edge of the sidewall.

In the preferred embodiment, the bottom wall is at least partially sloped so that settleable solid material will slide down the slope wall portion for collection.

In the preferred embodiment, an affluent is positioned at the lowest elevational position of the bottom wall for receiving settleable solids at the lowermost portion of the sloped bottom wall.

In the preferred embodiment, the weir includes a mechanical separator preferably in the form of a screen for separating fibrous material from the fluid stream that exits the overflow weir.

In the preferred embodiment, the weir includes first and second discharge outlet ports for respectively collecting separated fibrous material and overflow fluid.

In the preferred embodiment, the distribution assembly includes a centrally located inlet pipe communicating with the influent and a plurality of radially extending manifolds, each carrying multiple outlet ports for discharging influent water within the vessel interior.

In the preferred embodiment, the plurality of outlet ports are positioned vertically within the vessel interior at the mid portion thereof.

In the preferred embodiment, the weir includes a continuous overflow at the top of the sidewall of the vessel, extending circumferentially a distance around the vessel, preferably substantially around the vessel.

In one embodiment, the weir includes multiple circumferentially spaced weir structures each located at the top surface area of the vessel sidewall. Each weir structure includes a screen for receiving overflow from the vessel and a fluid receptive catch basin for collecting fluid separated from fibrous material using the screen.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

In FIG. 1A-2A illustrate the first embodiment of the apparatus of the present invention designated generally by the numeral 10A. In FIGS. 1B-2B, a second embodiment of the apparatus of the present invention is disclosed designated generally by the numeral 10B.

A third embodiment of the apparatus of the present invention is designated by the numeral 10C (FIG. 3B).

Figure 1A:
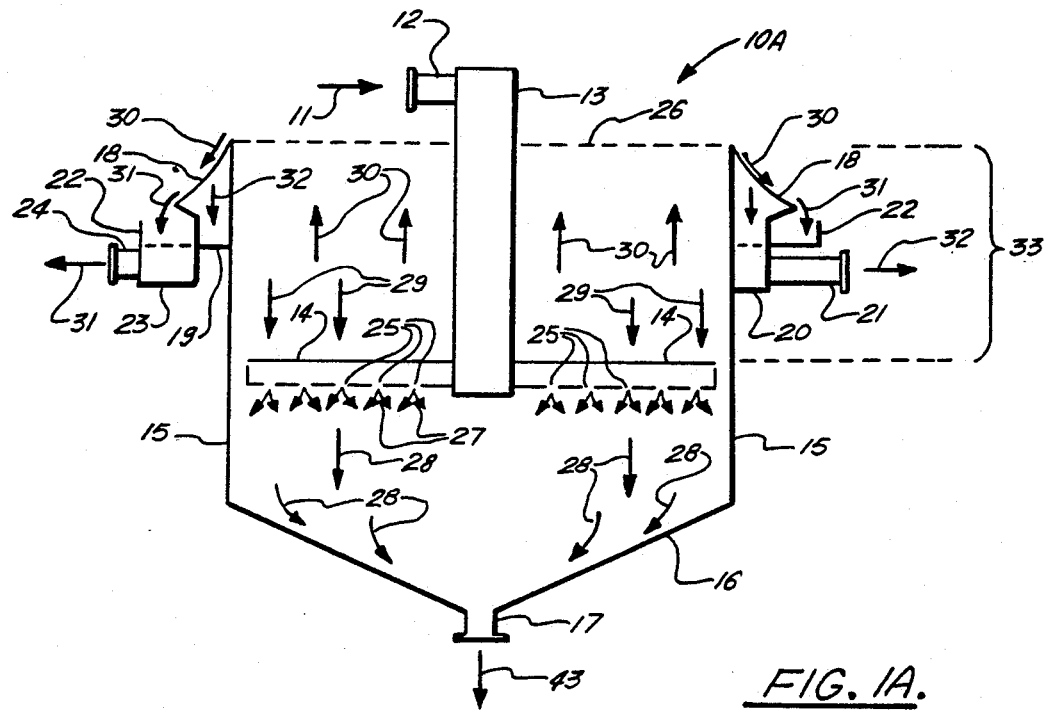
FIG. 1A is a side elevational view of the preferred embodiment of the apparatus of the present invention.
Figure 1B:
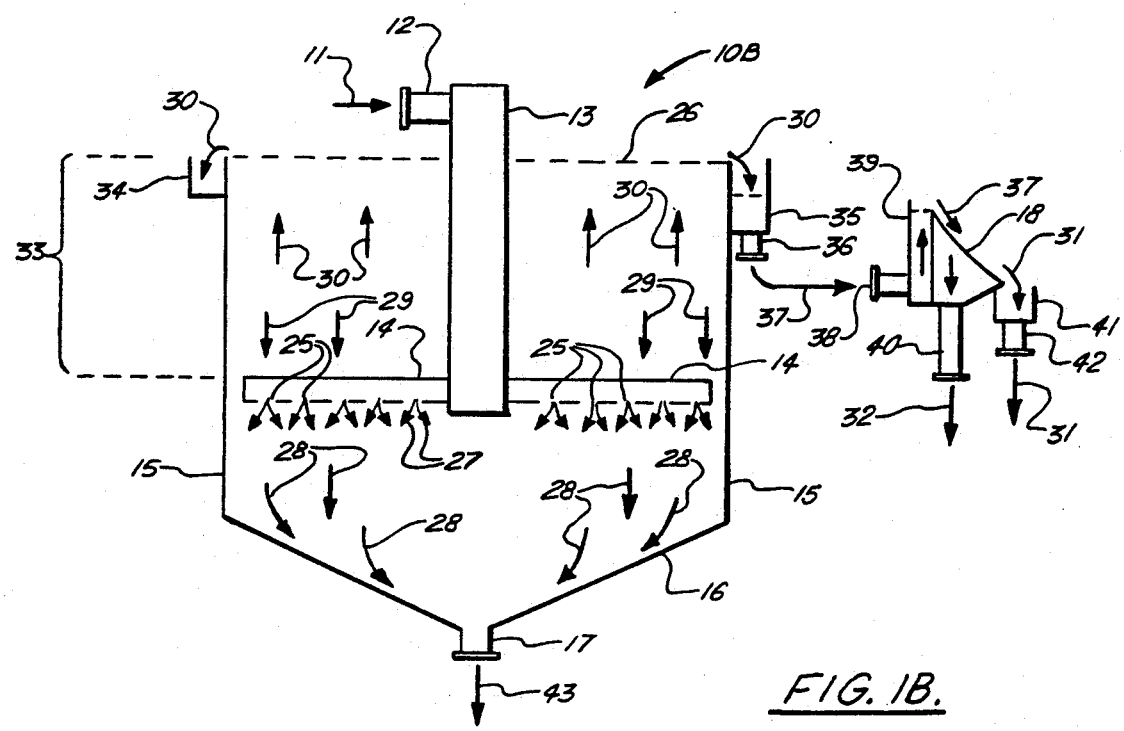
FIG. 1B is a side elevational view of a second embodiment of the apparatus of the present invention.
Figure 2A:
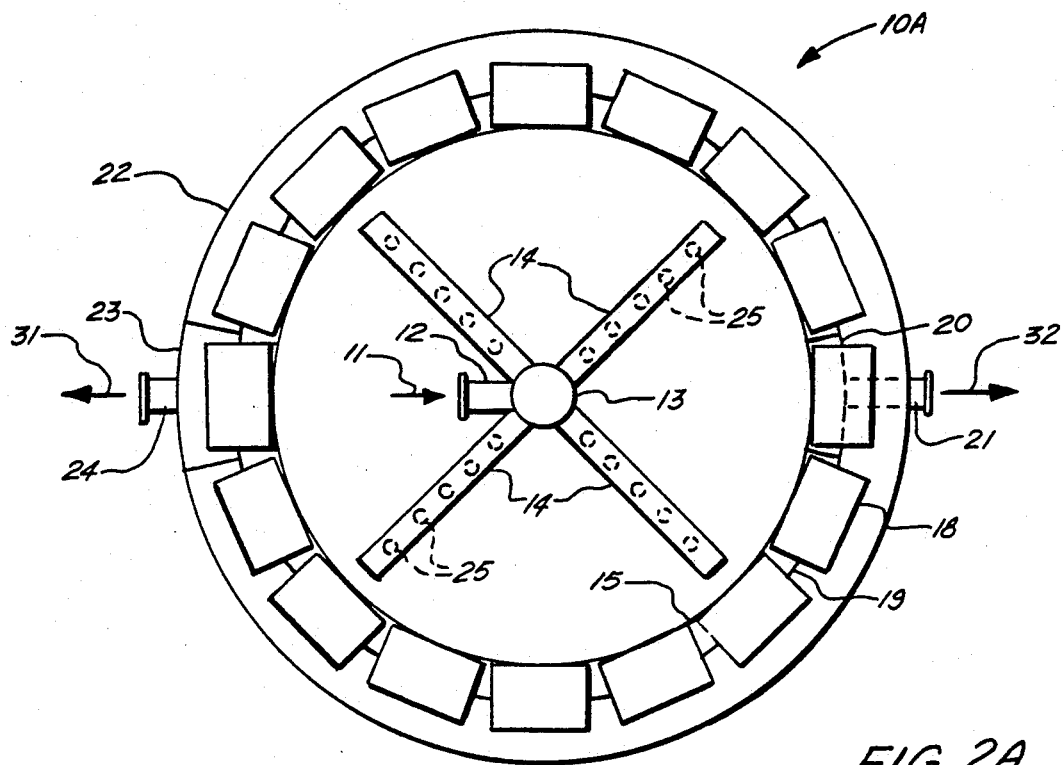
FIG. 2A is a top view of the first embodiment of the apparatus of the present invention.
Figure 2B:
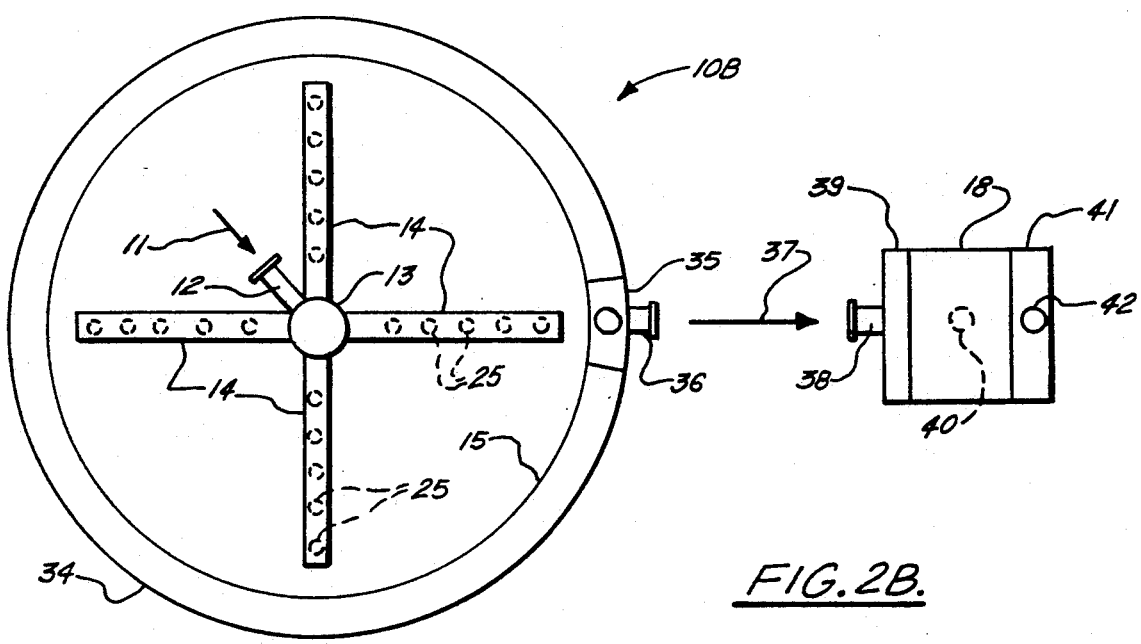
FIG. 2B is a top view of the second embodiment of the apparatus of the present invention.

In the embodiment of FIGS. 1A and 2A, apparatus 10A includes an influent process water stream 11 which typically contain contaminants and fibrous material which is to be reclaimed using the method and apparatus of the present invention.

A centrally located, generally vertically extending feed distribution pipe 13 extends from the uppermost portion of vessel 15 downwardly within the vessel interior which is defined by the vessel sidewall, that is preferably cylindrical and the vessel bottom 16 which is preferably sloped toward outlet 17. The feed distribution pipe 13 includes a plurality of for example four spoke-like feed pipes 14 each of which carrying a plurality of feed distribution orifices 25. The outlet 17 thus collects for discharge all heavy contaminants which slide along bottom 16 and exits heavy contaminants discharge outlet 17. Arrow 43 in FIG. 1A thus defines the heavy contaminant stream which exits vessel 15 during use.

The plurality of orifices 25 thus distribute flow substantially about the vessel interior and produce a upward velocity gradient which can be calculated as the feed volume (cubic ft. per minute) less the underflow volume (cubic ft. per minute) divided by the cross-sectional area of the vessel (square feet). The underflow is that material which is discharged from the lower portion of the vessel via outlet 17, namely the heavy contaminant stream 43. The overflow is that material which is discharged from the upper portion of the vessel. Thus, the heavy contaminants include all particulate matter having a settling velocity greater than the net upwardly velocity gradient of the primary treatment vessel. Lighter contaminants include all those particulate materials having a settling velocity less than or equal to the net upward velocity gradient of the primary treatment vessel.

All undesired particulate matter included in the light contaminants is thus discharged at the overflow weir. The overflow weir is defined as the upper end portion of the vessel sidewall 15 and is illustrated by the arrow 30 in FIG. 1A which includes the upward vertical component of fluid exiting the vessel. Thus the uppermost edge 26 of vessel 10A defines the fluid surface and thus is an overflow weir in the form of the upper circumferential top surface of the vessel 10A which would preferably be an equal horizontal elevational value when the vessel were leveled.

A static screen media 18, preferably inclined as shown in FIG. 1A collects fibrous material which is part of the overflow stream 30 because the fibrous stream is larger than the lighter contaminants which pass through the screen as indicated by the arrow 32 in FIG. 1A. FIG. 1A also indicates as arrow 31 the overflow of fibrous material into collection or basin sump 23 so that the fibrous material reclaimed can flow from the sump 23 at outlet 24 as indicated by the arrow 31 which is the received fibrous slurry overflowing from screen 18.

A circumferentially extending trough 19 collects the light contaminants which pass through the screen as indicated by the arrow 32. The basin 23 thus includes a vertically upstanding sidewall 22 that communicates with outlet 24. Trough 19 would extend circumferentially about the vessel 10A, communicating with discharge sump 20 and exit piping 21 which receives the light contaminant water stream indicated by the arrow 32. The structure 33 can be defined as a free settling zone for the vessel 10A which includes thus in combination the light contaminants 32 and the desirable fibrous material to be reclaimed indicated as 31. Sidewall 22 would extend circumferentially about the vessel collecting fibrous overflow which would flow downwardly until sump 23 receives the flow for discharge through exit piping 24.

Within vessel 10A interior, arrows 30 indicate the upward flow of light contaminants and fibrous material while the arrows 29 indicate downward flow. Heavy contaminants include the material falling below orifices 25 indicated as 28 in FIG. 1A. Distribution feed via outlets 25 is indicated as arrow 27 in FIG. 1A. In the embodiment of FIG. 1A-2A, a plurality of screens 18 is shown spaced circumferentially about 10A with fibrous material collection sump 22 extending substantially about vessel 10A communicating with collection sump 23 to the left of the FIG. in FIG. 2A.

In FIG. 2A, the light contaminants are shown as collected within this sump 20 which is to the right hand side of the FIG. 2A, communicating with discharge 21, illustrating as arrow 32 the light contaminant discharge.

In the embodiment of FIGS. 1B–2B, designated generally by the numeral 10B, the overflow 30 communicates with a single circumferentially extending trough 34 so that both light contaminants and fibrous material are collected at sump 35 for discharge via outlet 36. Thus the flow stream 37 includes both light contaminants and fibrous material. A spaced apart weir structure receives influent flow 37 at inlet fitting 38 which is received at influent portion 39 which is spaced from screen 18 with a vertically extending baffle that defines at its upper end portion the water surface. Overflow 37 reaches screen 18 which is preferably inclined with the light contaminant portion passing through the screen and discharging via downwardly extending outlet 40, defined as light contaminant and water discharge stream 32. The fibrous material is collected upon screen 18 and is discharged as 31 into sump 41 for discharge via downwardly extending outlet 42 as recovered fibrous slurry 31.

Figure 3A:
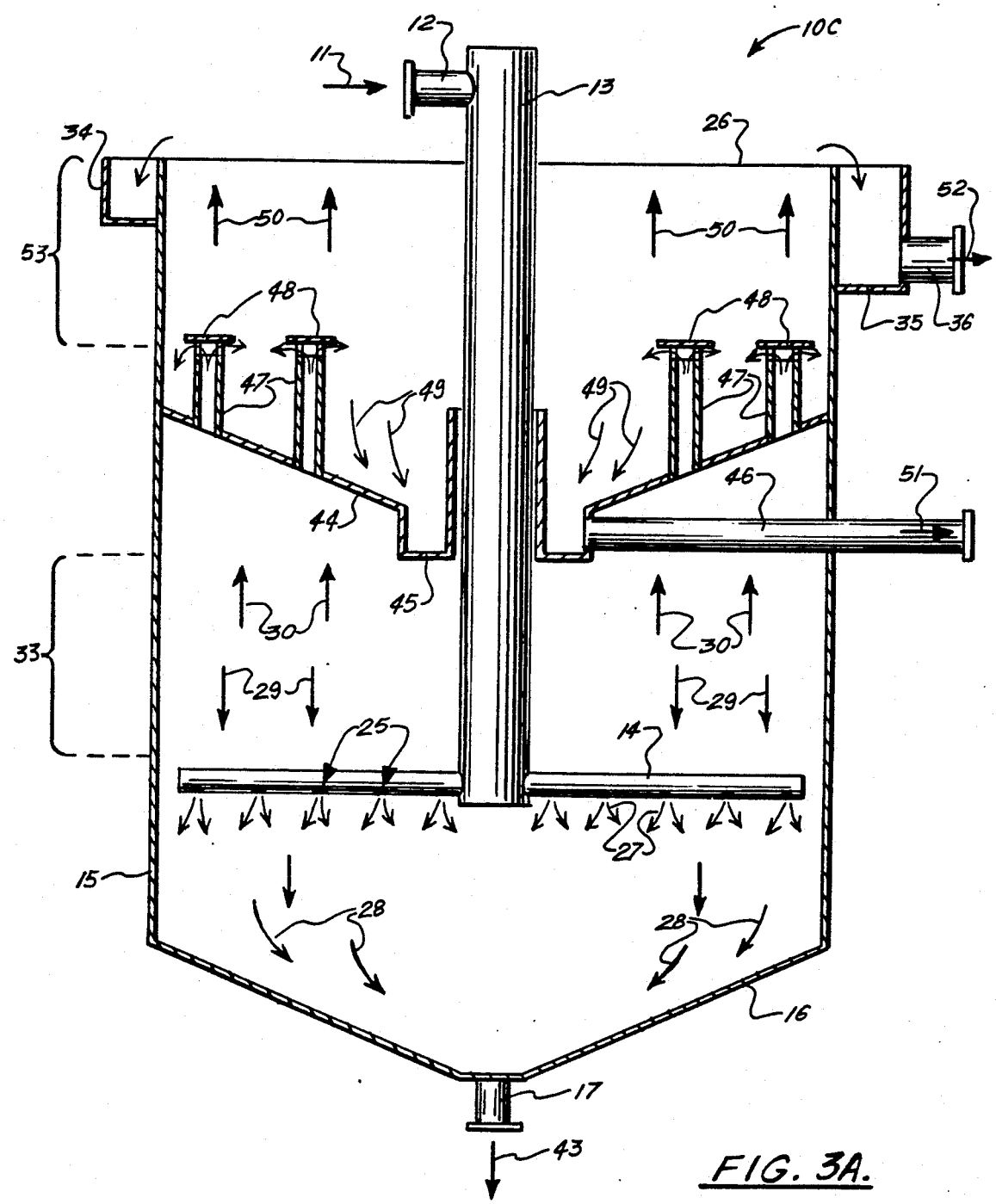
FIG. 3A is a third embodiment of the apparatus of the present invention.

In the event that the waste stream contaminants include plastic materials which are not desired in the final fibrous product, the treatment of the fluid stream within the vessel must be modified to minimize the amount of plastic in the fibrous material recovered. This modification as seen in FIG. 3A and employs an additional classification zone 53 above the free settling zone 33 of the vessel. In the zone 53, the lighter plastic material, along with other fine contaminants continues to rise and exit the top of the vessel at 26. The majority of fibrous material, along with a significant portion of the water stream 51 is collected using false bottom structure 44 which communicates with collecting well 45 and is removed from vessel 10C via discharge pipe 46 which extends laterally as shown in FIG. 3A. Fluid stream 51 can be further treated using screening. The majority of the plastic material will rise through zone 53 and will exit the top 26 of vessel at the weir structure defined by the top of wall 15 to be further treated prior to discharge. The majority of the fibrous material settles in zone 53 and is removed at collection trough 45 and via discharge pipe 46 for processing in the second stage using the screening device as illustrated with regard to the embodiment of FIG. 2B by entering inlet 38. A plurality of stand pipes 47 extend vertically above false bottom 44. Each stand pipe includes a transverse baffle 48 extending across its upper top portion which causes the flow to change directions. After exiting stand pipe 47, the heavier fibrous material will be collected as aforementioned within the well 45 while the lighter plastic material indicated by the arrows 50 in FIG. 3A proceeds upwardly to the overflow for collection at 34.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for the recovery of fibrous material from a pulp/paper manufacturing process water stream comprising:
   (a) influent means sized, constructed and arranged for receiving a process water stream from a pulp/paper manufacturing process;
   (b) a primary treatment vessel having an outer side wall terminating at an upper edge and a bottom defining in combination a fluid containment interior;
   (c) fluid distribution means, in fluid communication with the influent means and positioned at a middle elevational level of the primary treatment vessel, comprising multiple outlets for distributing the process stream to multiple locations at a middle elevational portion of the primary vessel and spaced laterally about the interior of the primary treatment vessel to minimize coagulation of light contaminants and fiber, constructed and arranged so that a rising fluid stream having a net upwards velocity gradient exceeding the settling velocity gradient of contained heavy contaminants is induced.
   (d) overflow weir means positioned above the fluid distribution means to receive the rising fluid stream therefrom and defining the vessel fluid surface, for allowing the rising fluid stream to exit the vessel at the fluid surface area;
   (e) effluent discharge means positioned under the fluid distribution means in the lower end portion of the primary treatment vessel for discharging heavy contaminants from the vessel that settle in the vessel under the influence of gravity; and
   (f) fibrous recovery means for separating reprocessable fibrous material from the process water stream comprising mechanical separator means contained in the overflow weir means.

2. The apparatus of claim 1, wherein the distribution means comprises a manifold having multiple discharge outlets spaced about the middle elevational level of the interior.

3. The apparatus of claim 1, wherein the weir means is positioned adjacent an upper edge of and about the entire periphery of the side wall.

4. The apparatus of claim 1, wherein the bottom is at least partially sloped.

5. The apparatus of claim 4, wherein the effluent means is positioned at the lowest elevational position of the bottom.

6. The apparatus of claim 1, wherein the weir means includes first and second discharge outlet port means for respectively collecting separated fibrous material and fluid.

7. The apparatus of claim 1, wherein the distribution means comprises a centrally located inlet pipe and a plurality of radically extending manifolds, each carrying multiple outlet ports for discharging influent fluid within the vessel interior.

8. The apparatus of claim 7, wherein the plurality of outlet ports are positioned vertically at 1 mid-portion of the vessel interior.

9. The apparatus of claim 1, wherein the weir means includes a continuous overflow at an upper edge of the side wall, extending circumferentially a distance around the periphery of the vessel.

10. The apparatus of claim 9, wherein the overflow extends substantially around the vessel.

11. The apparatus of claim 1, wherein the weir means includes multiple, circumferentially spaced weir structures located about top surface areas of the vessel side wall.

12. The apparatus of claim 11, wherein each weir structure includes a screen for receiving overflow from the vessel and a fluid receptive catch basin for collecting fluid separated from fibrous material using the screen.

13. The apparatus of claim 12, wherein the screen is inclined.

14. The apparatus of claim 1, wherein the weir means includes a screen means, spaced from the primary vessel for separating fibrous material from overflow fluid leaving the vessel.

15. The apparatus of claim 1, wherein there is further provided a false bottom of the primary vessel positioned generally between the vessel upper edge and the fluid distribution multiple locations, the false bottom carrying one or more vertically extending conduits extending upwardly therefrom and the bottom including a sloped portion that collects fibrous material at the lowermost portion thereof.

16. The apparatus of claim 1, wherein there is further provided an annular false bottom portion extending substantially around the vessel interior and including a sloped portion having a lowermost portion thereof that collects material which slides upon the sloped portion, the false bottom being positioned generally between the vessel upper edge and the fluid distribution means at the water multiple locations, and an effluent pipe extends from the lowermost portion of the false bottom externally of the primary treatment vessel.

17. The apparatus of claim 1, wherein the fibrous recovery means includes means positioned between the water surface and the fluid distribution means for removing fibrous material from a position within the primary treatment vessel interior at the middle elevational portion of the primary treatment vessel.

* * * * *